United States Patent
Gyöngy et al.

(10) Patent No.: US 10,928,515 B2
(45) Date of Patent: Feb. 23, 2021

(54) METHOD FOR GENERATING ULTRASOUND IMAGE AND COMPUTER READABLE MEDIUM

(71) Applicant: Dermus Kft, Budapest (HU)

(72) Inventors: Miklós Gyöngy, Budapest (HU); Gergely Csány, Budapest (HU)

(73) Assignee: Dermus Kft., Budapest (HU)

( * ) Notice: Subject to any disclaimer, the term of this patent is extended or adjusted under 35 U.S.C. 154(b) by 396 days.

(21) Appl. No.: 15/738,346

(22) PCT Filed: Jun. 24, 2016

(86) PCT No.: PCT/HU2016/000041
§ 371 (c)(1),
(2) Date: Dec. 20, 2017

(87) PCT Pub. No.: WO2016/207673
PCT Pub. Date: Dec. 29, 2016

(65) Prior Publication Data
US 2018/0313954 A1 Nov. 1, 2018

(30) Foreign Application Priority Data
Jun. 26, 2015 (HU) .................................. P1500299

(51) Int. Cl.
*G01S 15/89* (2006.01)
*G01S 7/52* (2006.01)
(Continued)

(52) U.S. Cl.
CPC ...... *G01S 15/8993* (2013.01); *G01N 29/0654* (2013.01); *G01N 29/265* (2013.01);
(Continued)

(58) Field of Classification Search
CPC ............. G01S 15/8977; G01S 15/8934; G01S 15/8936; G01S 15/895; G01S 15/8993;
(Continued)

(56) References Cited

U.S. PATENT DOCUMENTS 5,582,173 A 12/1996 Li
5,690,113 A 11/1997 Sliwa, Jr. et al.
(Continued)

FOREIGN PATENT DOCUMENTS

EP 0927539 A1 7/1999
WO 2009149499 A1 12/2009

OTHER PUBLICATIONS

Ahmad et al., "Cross-correlation-based image acquisition technique for manually-scanned optical coherence tomography", Optics Express, May 2009 vol. 17, No. 10. (Year: 2009).*

(Continued)

*Primary Examiner* — Pascal M Bui Pho
*Assistant Examiner* — Yi-Shan Yang
(74) *Attorney, Agent, or Firm* — Wood Herron & Evans LLP

(57) ABSTRACT

An ultrasound image is generated by recording data packages while moving an ultrasound transducer along an investigation surface. A plurality of recording locations separated by a recording spacing is determined. A data package is recorded by placing the ultrasound transducer in a recording location on the investigation surface, and assigning the data package to an image column of the ultrasound image corresponding to the recording location. A subsequent data package is recorded by moving the ultrasound transducer in an image recording direction toward a forthcoming recording location, and evaluating a data package acceptance criterion by comparing one or more actual image correlation and corresponding correlation function values, investigating (Continued)

fulfillment of the acceptance criterion, and if the acceptance criterion is fulfilled, assigning, for the forthcoming recording location, the subsequent data package to a forthcoming image column of the ultrasound image by loading the subsequent data package into the forthcoming image column.

12 Claims, 6 Drawing Sheets

(51) Int. Cl.
*G01N 29/06* (2006.01)
*G01N 29/265* (2006.01)

(52) U.S. Cl.
CPC ...... *G01S 7/52034* (2013.01); *G01S 7/52046* (2013.01); *G01S 7/52085* (2013.01); *G01S 15/895* (2013.01); *G01S 15/8934* (2013.01); *G01S 15/8936* (2013.01); *G01S 15/8977* (2013.01); *G01N 2291/106* (2013.01)

(58) Field of Classification Search
CPC ............. G01S 7/52034; G01S 7/52046; G01S 7/52085; G01N 2291/106; G01N 29/0654; G01N 29/265
See application file for complete search history.

(56) References Cited

U.S. PATENT DOCUMENTS

| | | | |
|---|---|---|---|
| 5,782,766 | A | 7/1998 | Weng et al. |
| 6,012,458 | A | 1/2000 | Mo et al. |
| 6,102,865 | A | 8/2000 | Hossack et al. |
| 6,132,376 | A | 10/2000 | Hossack et al. |
| 6,352,508 | B1 | 3/2002 | Pang et al. |
| 6,503,201 | B1 | 1/2003 | Liu et al. |
| 6,517,491 | B1 | 2/2003 | Thiele et al. |
| 6,988,991 | B2 | 1/2006 | Kim et al. |
| 2010/0262007 | A1 | 10/2010 | Medlin et al. |
| 2010/0305443 | A1 | 12/2010 | Bartlett et al. |
| 2011/0083511 | A1* | 4/2011 | Taki ............... A61B 8/0833 73/602 |
| 2011/0098571 | A1 | 4/2011 | Medlin et al. |
| 2012/0157851 | A1* | 6/2012 | Zwirn .............. G01S 7/52047 600/447 |
| 2012/0238876 | A1 | 9/2012 | Tanabe et al. |
| 2013/0225986 | A1 | 8/2013 | Eggers et al. |
| 2013/0245428 | A1 | 9/2013 | Banjanin et al. |
| 2014/0018668 | A1* | 1/2014 | Zheng .................. A61B 8/488 600/424 |
| 2014/0257080 | A1 | 9/2014 | Dunbar et al. |
| 2015/0374341 | A1* | 12/2015 | Chen ................. G01S 15/8977 600/443 |
| 2016/0262706 | A1* | 9/2016 | Zhao .................... A61B 5/7282 |

OTHER PUBLICATIONS

Lang et al., "Fusion of electromagnetic tracking with speckle-tracked 3D freehand ultrasound using an unscented Kalman filter". Medical Imaging 2009., Proc. of SPIE vol. 72651A, pp. 1-13. (Year: 2009).*
Afsham, Narges, et al., "A Generalized Correlation-Based Model for Out-of-Plane Motion Estimation in Freehand Ultrasound," IEEE Transactions on Medical Imaging, Jan. 2014, pp. 186-199, vol. 33, No. 1 (14 pages).
Ahmad, Adeel, et al., "Cross-correlation-based image acquisition technique for manually-scanned optical coherence tomography," National Instiute of Health Public Access, Author Manuscript, May 2009, pp. 8125-8136, vol. 17 (10) (18 pages).
Fang, Dong, et al., "Distance Estimation in Ultrasound Images Using Specific Decorrelation Curves," Wuhan University Journal of Natural Sciences, 2013, pp. 517-522, vol. 18, No. 6 (6 pages).
International Searching Authority, Search Report and Written Opinion issued in International Applicaiton No. PCT/HU2016/000041 dated Sep. 12, 2016 (10 pages).
Jensen, Jorgen Arendt, "A model for the propagation and scattering of ultrasound in tissue," The Journal of the Acoustical Society of America, Jan. 1991, pp. 182-190), vol. 89, Issue 1, Acoustical Society of America (9 pages).
Lang, Andrew, et al., "Fusion of electromagnetic tracking with speckle-tracked 3D freehand ultrasound using an unscented Kalman filter," Medical Imaging 2009: Ultrasonic Imaging andSignal Processing, Proc. of SPIE vol. 7265, 72651A (12 pages).
Wikipedia, "Correlation and dependence," https://en.wikipedia.org/wiki/Correlation_and_dependence, last edited on Dec. 6, 2017 (8 pages).

* cited by examiner

METHOD FOR GENERATING ULTRASOUND IMAGE AND COMPUTER READABLE MEDIUM

TECHNICAL FIELD

The invention relates to a method for generating ultrasound image. Furthermore, the invention relates to a computer readable medium, which comprises a computer program, and the execution of the computer program on a computer causes the execution of the method for generating an ultrasound image.

BACKGROUND ART

Nowadays pulse-echo based ultrasound imaging is one of the most widespread imaging modalities, two of the most frequent applications being the non-destructive testing (NDT) of various manufactured materials and human or veterinary diagnostic ultrasound (DUS).

Pulse-echo imaging requires a transducer that transmits an acoustic wave and transforms the received echo (reply) acoustic wave into a signal that can be recorded. A distinction is made between single and multiple element transducers. Transducers typically comprise one or more piezoelectric elements. The electrical excitation of each element causes an ultrasound wave to be generated, and the backscattered ultrasound is converted back into an electrical signal. In the case of multiple elements, the relative amplitudes and timings of the excitations, as well as the relative weights and delays involved in the summation of the signals obtained from the received signals allow the modification of the ultrasound beam.

The steps of ultrasound imaging are illustrated in FIG. 1. Each ultrasound image is composed of so-called A-lines. These A-lines may produce 2D images. 3D images may themselves be composed of a series of 2D images or of arbitrarily oriented A-lines. Each A-line originates from a temporally varying signal response to an ultrasound pulse transmitted along the direction of the ultrasound beam. Therefore, as illustrated in FIG. 1, the generation of an A-line requires the generation and transmission of an electrical impulse to a 10 ultrasound transducer (which in response creates an ultrasound wave), the isolation, from the transmitted signal, of the electrical signal received by the 10 transducer, as well as the pre-amplification and digitalization of the received signal. In the case of a single scatterer being placed along the A-line, the distance z between the transducer and the scatterer may be obtained from the equation $z=ct/2$, where c is the speed of sound in the medium, and t is the time between the transmission of the ultrasound impulse and the reception of the backscattered wave. Accordingly, the spatial map of scatterers can be mapped from the temporally varying signal since the signal from scatterers nearer the transducer appear earlier in time, while the signal from scatterers further from the transducer appear later in time, as determined by the above equation.

In general, reflections from a multiplicity of scatterers give contribution to an A-line, however even in such a case, the temporal signal is converted into a spatial signal based on the above $z=ct/2$ equation. It is possible for the A-line to undergo further processing steps, such as signal filtering, envelope detection, dynamic range compression. Since these steps may appear at several places in the flow diagram of FIG. 1, for ease of interpretation these have been omitted from FIG. 1.

After their generation, A-lines need to be geometrically aligned with each other to create an image. This step is called scan conversion, after which step the image may be displayed, as illustrated in FIG. 1. Scan conversion requires knowledge of the line of the movement of the transducer according to which the A-lines represent the investigated medium. This knowledge is closely related to the manner in which the A-lines were focused and/or scanned.

It is the simplest focusing method that the transducer generates a single fixed beam owing to its geometric shape and/or the use of an acoustic lens. The disadvantage of such an approach is that there needs to be some method to scan the beam in order to produce an image. When a transducer consists of several, appropriately aligned elements, it is possible to scan the A-lines in several directions by delaying transmission of ultrasound waves of the transducer elements, as well as by delayed summation of the received signals. This approach is termed electronic scanning.

In the case of single element transducers, depth information is obtained along a line, so that 1-D (one-dimensional) information is recorded. In the case of elements placed in a row (a so-called linear array), the use of an acoustic lens allows imaging (focusing) in a plane, so that each recording produces a 2D image. In the case of transducer elements being placed on a plane (whose orientation is preferably perpendicular to the investigation surface), electronic scanning of an entire 3D volume becomes possible.

Using electronic scanning, the spatial position of A-lines can be pre-determined from the arrangement of the transducer elements and the delay profiles involved in transmission and reception. Its disadvantage, however, is that an increasing number of elements causes an increased electronic complexity. An alternative or complementary solution is mechanical scanning, where the transducer is physically moved in some manner. A typical method of mechanical scanning is when the transducer is moved along a line above the scanned space part (medium). As shown in FIGS. 2 and 3, this increases the number of dimensions that can be achieved: with the use of transducer 20 (which may be a single element or an annular array transducer), the alignment of data packages 24 or in other words A-lines allows a 2D ultrasound image or a so-called B-mode image to be generated, while with the use of a linear array transducer 30, 2D (B-mode) data packages 34, i.e. 2D ultrasound images may be recorded one after the another and aligned to create a 3D image. As shown later, in both cases there is a row of data packages (data frames). In both cases, the spatial locations of these lines or planar sections need to be known or estimated in order to be aligned using scan conversion to generate the required 2D or 3D images.

As has been noted above, mechanical scanning needs to establish the locations (positions) associated with the A-lines in order to perform scan conversion (see FIG. 1), as otherwise there would be no information about how to reconstruct images from the A-lines at our disposal. Location determination may be of two types: one using position sensors, the other based on the recorded data themselves.

In the case of a mechanical system moving the transducer, a position sensor may be integrated into the mechanical system. U.S. Pat. No. 5,690,113, which concerns the topic of mechanical scanning of single element transducers, provides a useful review of this concept. US 2012/0238876 A1 describes a motorized system that moves a linear array transducer, allowing a series of 2D images to be merged into a 3D image.

An alternative is the manual movement of the transducer. Manual movement may be advantageous when the investigation surface is relatively complex, such as in the case of a human patient. It may also be advantageous because of its less complex design (there is no need for moving mechanisms). Here too, position determination will be needed in order for scan conversion to occur. The problem of position determination may again be solved using position sensors, or alternatively, with the data comprised in the recorded A-lines.

Several types of position sensors are known. Localization based on magnetic fields (U.S. Pat. No. 6,517,491; US 2014/0257080 A1) or electromagnetic waves (U.S. Pat. No. 5,690,113; US 2013/0245428 A1) is widespread. Furthermore, the use of optical or infrared sensors is also possible (US 2013/0225986 A1). Another known approach concerns transducer elements that are rotated but not translated during imaging. The angular movement can then be measured using a tilt meter such as a gyroscope, allowing the scan conversion of 1D A-lines (US 2011/0098571 A1; WO 2009/149499 A1; US 2010/0305443 A1; US 2010/0262007 A1), i.e. image generation from A-lines, or, using a similar approach, the generation of a 3D images from images (EP 0927539 A1). It is also known to place two linear arrays at the two ends of a linear array; with the elements of the two linear arrays placed perpendicularly to those of the central array, the two edge arrays are able to estimate tilting (U.S. Pat. Nos. 6,102,865; 6,132,376).

Although position sensors generally provide adequate accuracy for scan conversion, their disadvantage is that they increase the hardware complexity of the ultrasound imaging system. In an alternative approach, position is estimated based on the data packages themselves; this is termed data-based scan conversion. In the known approaches, this approach is only used in linear array transducers, when combining electronically focused 2D images. In known methods, it can be a way of combining these 2D images that the transducer moves in the plane of the 2D images, generating "panoramic" or "extended field of view" images (U.S. Pat. Nos. 6,352,508; 6,503,201; 5,782,766), i.e. a 2D image can be increased in side direction using this method. In such imaging methods, 2D cross-correlation techniques similar to those used in making a panoramic image from a series of images are employed. In another known method of combining 2D images from linear transducers, the transducer is moved in the elevation direction (see FIG. 2, y-direction), a direction largely parallel to the surface of the investigated medium (see FIG. 3). In this case, owing to the finite elevation resolution of the ultrasound images, the correlation (or more generally, a measure of similarity) between images may be used to estimate displacement in the elevation direction. In the following, the definition of a correlation function is provided, and its use in estimating elevation displacement in current methods is shown. At the same time, the current practice of data-based scan conversion is described.

The basic function of the correlation coefficient (p) is to give a one-to-one (bijective) connection between the correlation p of two data packages (be they A-lines or two-dimensional B-mode images) and the distance d between the two data packages (see FIG. 4). The correlation coefficient may be defined in several ways, for instance the Pearson correlation coefficient may be used, or alternatively it may be based on the differences of the absolute values (U.S. Pat. No. 5,582,173; https://en.wikipedia.org/wiki/Correlation_and_dependence); however, other definitions of the correlation coefficient also exist. In the discussion that follows, without loss of generality, the correlation coefficient is normalized between 0 and 1, where 0 represents a complete lack of similarity between two images, and 1 represents that the two images are the same.

In order to measure the distance between two data packages, an estimation of the function ρ(d) is necessary. As can be understood from the discussion below, this estimation is not a straightforward task owing to the fact that ρ(d) is not only dependent on the ultrasound imaging system (e.g. the level of focusing of the transducer) but also on the acoustic structure of the investigated medium. It is a generally accepted fact (see e.g. Jensen, Jørgen Arendt: A model for the propagation and scattering of ultrasound in tissue, in J. Acoust. Soc. Am. vol. 89 (1), pp. 182-190, (1991)) that ultrasound imaging may be well modelled as the time shift-dependent (delay-dependent) convolution of an acoustic scattering function S (describing the acoustic structure of the investigated medium) with the P response of the ultrasound imager system (otherwise known as the point spread function):

$$F(x,y,z)=\iiint S(x-\tau_x,y-\tau_y,z-\tau_z)P(\tau_x,\tau_y,\tau_z|x,y,z)\cdot d\tau_x\cdot d\tau_y\cdot d\tau_z,$$

where $F(x,y,z)$ is the ultrasound image, and $P(\tau_x,\tau_y,\tau_z|x,y,z)$ is the spatial response (in other words, the image of the point scatterer) of the ultrasound imaging system to a point scatterer in location (position) x,y,z as a function of spatial coordinates $\tau_x,\tau_y,\tau_z$. Since the transducer will be moved in the y-direction, in the following, the autocorrelation of $F(x,y,z)$ in the y-direction will be considered. Let $\rho_f(u=d)$ be the autocorrelation of function f taken in the u direction:

$$\rho_f(u=d)=\int f(u=\tau_y)f(u=\tau_y-d)d\tau_y,$$

which function may be normalized by the variance of f(u) if we wish to obtain—as will be the case later on an autocorrelation measure between 0 and 1. $\mathcal{F}\{\bullet\}$ denotes the Fourier transformation operator, while * denotes the convolution operator. According to the Fourier theorem, namely that a spatial convolution corresponds to multiplication in the spatial frequency domain, as well as using the definition of the autocorrelation function in the above equation leads to the following equations $$\rho_F(y)=\rho_S(y)*\rho_P(y) \text{ and}$$

$$\mathcal{F}\{\rho_F(y)\}=\mathcal{F}\{\rho_S(y)\}\mathcal{F}\{\rho_P(y)\}.$$

In these equations, autocorrelation is evaluated in the y (elevation) direction. From these equations it can be observed that the autocorrelation of the ultrasound image in the y-direction (being the favoured direction) may be estimated as a function of the Fourier spectra of S and P. This leads to the observation that when S arises from a single point scatterer, or when S arises from a white noise process (that is, its spectrum is white noise), $\rho_S(y)$ will be Dirac-delta function, so that $$\rho_F(y)=\rho_P(y)$$

In view of the above, a possible correlation metric is $\rho(d)=\rho_F(y=d)$, which in the above circumstances may be estimated by $\rho_P(y)$.

The equation above remains valid even when the condition of a white noise process is relaxed, and our only requirement is that at those frequencies where the amplitude spectrum of P is non-zero, the amplitude spectrum of S be constant.

This requirement can be made to correspond with the condition of so-called "fully developed speckle", which is a common simplifying assumption used in ultrasound imaging. In the case where this assumption is justified, the estimation of ρ(d) is a simple task, since there are several known methods by which P and thereby $\rho_P(y)$ can be estimated. However, many types of biological tissue do not cause fully developed speckle for commonly used imaging systems; several methods have been developed to correct this assumption.

A further approach that may be used when the fully developed speckle assumption is not warranted (that is, speckle is not fully developed) is based on the assumption that the acoustic structure of the tissue is isotropic, so that the autocorrelation of F between in the transverse x- and elevational y-direction (see FIG. 2) will be similar. As a consequence, the approach further assumes that the data in the 2D images (being in the x-direction) may be used to estimate function ρ(d) in the y-direction. This approach is described in U.S. Pat. No. 6,988,991. Disadvantageously, this approach does not adequately address the issue that the autocorrelation of P will not be identical in the x- and y-directions, especially when using a transducer whose geometry and/or elements is not rotationally symmetric in the x- and y-directions. Furthermore, this assumption does not allow the scan conversion of a series of 1D A-lines into 2D images, since it is not possible to calculate the x (transverse) direction autocorrelation from 1D A-lines, and therefore there is no function available from which the autocorrelation function in the y (elevation) direction may be estimated.

In the case when assumption of fully developed speckle is not met, another approach defines a correlation coefficient that is based on a more general model of speckle formation (N. Afsham et al.: A generalized correlation-based model for out-of-plane motion estimation in freehand ultrasound, in: IEEE Transactions on Medical Imaging, vol. 33, issue 1, pp. 186-199 (2014)). The disadvantage of this approach is that the statistical model cannot describe all possible speckle structures. A third approach builds a database of many different types of speckle pattern with corresponding distance measurements. This database is used to train a distance-estimating algorithm (J. Conrath and C. Laporte: Towards Improving the Accuracy of Sensorless Freehand 3D Ultrasound by Learning, in: Machine Learning in Medical Imaging. Springer Berlin Heidelberg, 2012, pp. 78-85). In addition to its complexity, the disadvantage of such an approach is that again, it cannot cover (take into account) all possible speckle structures. Moreover, the database is specific to a given ultrasound device.

The current practice of data-based scan conversion utilizing correlation data is illustrated in FIG. 5. According to this approach, a given number of data packages are recorded ($F_1$, $F_2$, $F_3$, . . . , $F_{n-1}$, $F_n$) as the transducer scans the investigated volume. The location at which these data packages are recorded depends on the velocity of the transducer, and on the rate of change of the velocity. Then, during the post-processing, for all the recorded data packages, correlations are calculated between each of the recorded data packages and other data packages or a part thereof, and from this information using a model correlation function ρ(d), the distances between the data packages are estimated.

The details of this method, along with its disadvantages, are presented below. Let $d_{ij}$ be the real distance between two data packages $F_i$ and $F_j$. Let further $\rho_{ij}$ be the correlation coefficient calculated for $F_i$ and $F_j$, ρ(d) the estimated, function of the correlation coefficient as a function of distance d (model correlation function), and d(ρ) the inverse of this function. For the real distances, it can be stated that $$d_{ik}=d_{ij}+d_{jk},$$

in other words, the distances between the real images add up. However, it is important to note that the distances $\hat{d}_{ij}=d(\rho_{ij})$ estimated using the inverse function d(ρ) will not add up, so that $$\hat{d}_{ik} \neq \hat{d}_{ij}+\hat{d}_{jk}.$$

One of the main reasons for this inequality is that the ultrasound images are noisy, so the inverse function d(ρ) tends to have estimation errors. This error is especially high at those ranges where ρ(d) has values close to 0 or 1, which corresponds to the two data packages being very far from, or very close to, each other, respectively. It follows from the above that for a distance $d_{ik}$ there may be several estimates $D_{ik}(n)$ (where $D_{ij}$ denotes an estimate of the distance $d_{ij}$, and n the index of the estimate). For instance, one estimate may be $D_{ik}(1)=\hat{d}_{ik}$ (direct estimation), while another may be $D_{ik}(2)=\hat{d}_{ij}+\hat{d}_{jk}$ (obtained from the addition of two estimates). Since the accuracy of the different estimates will vary, the question arises as to how to combine $D_{ik}(n)$ in a way that provides the best accuracy. The approaches to this question that can be found in the literature (U.S. Pat. Nos. 5,582,173; 6,988,991; 6,012,458) all use weighted averages of the estimates $D_{ik}(n)$, where the weight may even be zero (e.g. when the given estimation differs too much from the average of estimations) for certain criteria. The estimate that is combined from the group of estimates $D_{ik}(n)$ for different n is depicted without an index, that is, by $D_{ik}$.

In summary, the current practice of data-based scan conversion can be described with the following steps:
1. estimation of ρ(d) using one of the methods described above
2. recording phase: recording of all the data packages from the investigated medium
3. evaluation phase: calculating a plurality of estimates ($\hat{d}_{ij}$) of the distances between all pairs of recorded data packages using ρ(d)
4. for adjacent data packages, generation of estimates $D_{ij}$ using the estimates $\hat{d}_{ij}$ (in this step estimates $\hat{d}_{ij}$ are combined to have as many as possible estimations for the distances between adjacent data packages), and then determination of a single estimate $D_{ij}$ for each of adjacent image pairs, then
5. based on these estimations, generation, from the data packages recorded as illustrated in FIG. 5, of data packages ($I_1$–$I_n$ in FIG. 5) placed at regular intervals Δy from each other, using linear interpolation, then generation of a complete ultrasound image As can be seen from the above steps, the greatest disadvantage of the current practice is that the scan conversion of the ultrasound image (and thereby its display) occurs offline rather than in real time, since all the data packages need to be recorded to be possible to generate—according to the known approach, using linear interpolation—images being equal distance from each other.

In the practice of ultrasound imaging there is a need for real-time display of scan converted image, that is, just after the receipt of the data. In current practice, real-time display requires either a device with position sensors or with complex electronics and/or with moving mechanisms (US 2011/0098571 A1, WO 2009/149499 A1, US 2010/0305443 A1, US 2010/0262007 A1).

In light of the known approaches, the need has arisen for a solution where an ultrasound image can be updated in real time (that is, as the data packages arrive, immediately) also when the transducer is mechanically scanned (e.g. manually).

DESCRIPTION OF THE INVENTION

The primary object of the invention is to provide a method for generating ultrasound image which is free from disadvantages of prior art solutions to the greatest possible extent.

A further object of the invention is, according to the above demands, to provide a method for generating ultrasound image application of which makes real-time refreshing of the ultrasound image possible, i.e. to build the ultrasound image real-time from 1D or 2D data packages by the help of 1D or 2D image columns and to display the ultrasound image in real-time also with mechanical (e.g. manual) scanning.

The object of the invention is to provide a method for generating ultrasound image where even in the case of manual scanning, the data packages that are loaded into the columns of the displayed image are regularly spaced. A further object of the invention is to make the applicability of this method independent from the speed of the transducer motion and from the variation of said speed.

The objects of the invention can be achieved by the method according to claim 1 and by the computer readable medium according to claim 15. Preferred embodiments of the invention are defined in the dependent claims.

BRIEF DESCRIPTION OF THE DRAWINGS

Preferred embodiments of the invention are described below by way of example with reference to the following drawings, where.

MODES FOR CARRYING OUT THE INVENTION

Figure 6:
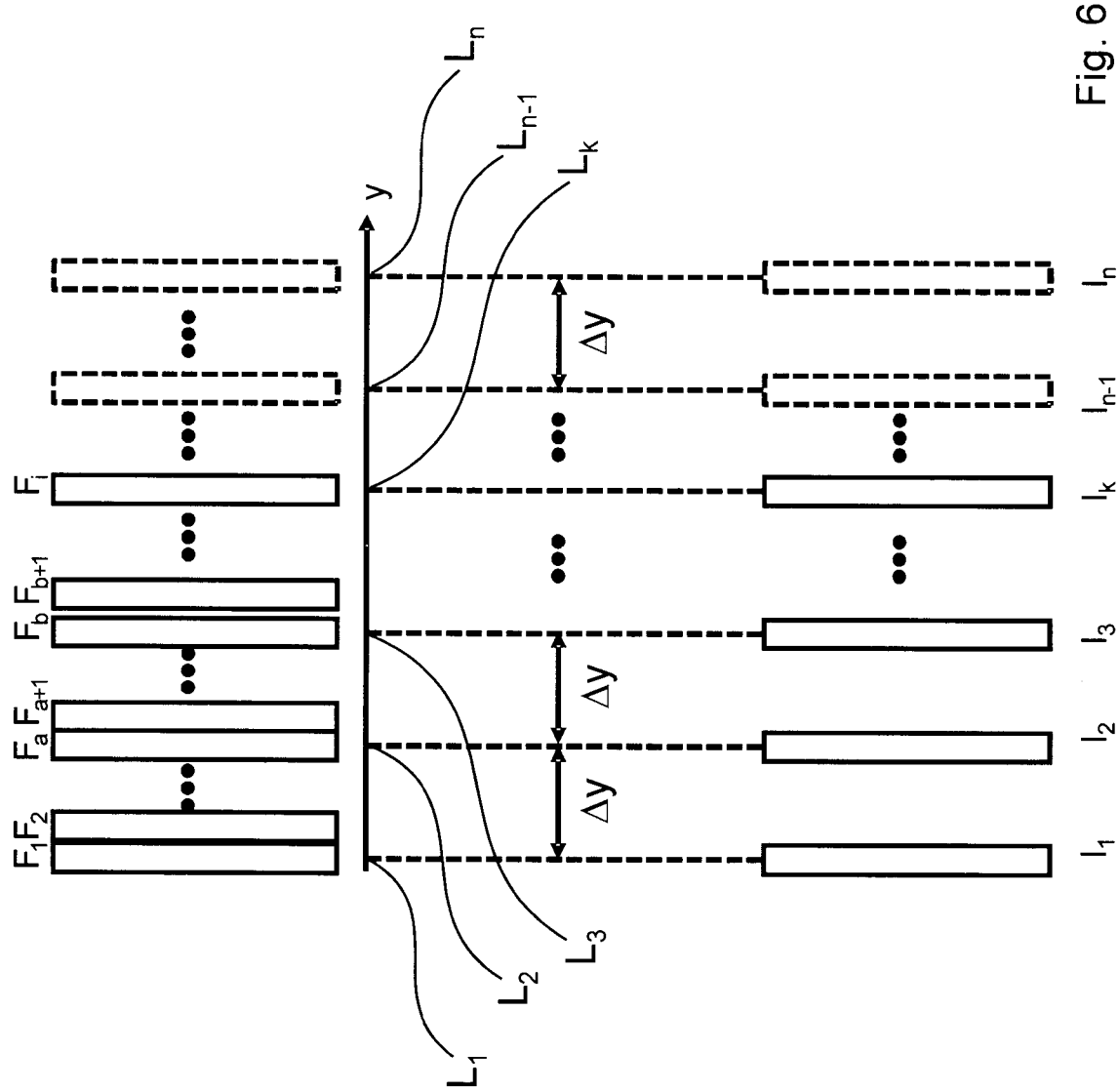
FIG. 6 is a schematic drawing illustrating an embodiment of the method according to the invention.

An embodiment of the method according to the invention, for generating ultrasound image, is illustrated in FIG. 6. In the course of this method according to the invention, data packages are recorded by moving an ultrasound transducer along an investigation surface and based on the data packages the ultrasound image is generated. The transducer is typically moved as it is placed on the investigation surface to scan an investigation volume bordered by the investigation surface. In the method according to the invention the transducer is preferably moved manually. While the method described may also be used in a setup where the transducer is moved using some motion mechanism (mechanically), the advantages of the invention particularly manifest in the case of manual movement. During manual scanning it can happen that the transducer does not move directly on the investigation surface, thus, the transducer can be shifted from investigation surface during the method. Into the motion along the investigation surface it is also meant when the transducer couples to the investigation surface through coupling gel. The data packages recorded by the transducer form a group or set of data packages, each data package being associated with the location at which it was recorded. The data package in particular in case of 2D data packages is called also data frame.

The method according to the invention comprises the following steps; in other words, the above steps (recording of data packages, generation of ultrasound image) are achieved using the following steps according to the invention.

At the start of the method, a plurality of recording locations (recording points) $L_1$, $L_2$, $L_3$, $L_k$, $L_{n-1}$, $L_n$, are determined separated from each other by a recording spacing (recording distance) $\Delta y$. Therefore, in this step, the recording locations are determined; this may occur by determining the value of recording spacing $\Delta y$ (either predetermined or selected by the user) in some way, then calculating the desired recording locations from this value. Then, as the user begins to move the transducer in a direction of his/her choosing, the image recording direction and the recording locations become determined. In this direction, knowing $\Delta y$, the future recording locations (composing $\Delta y$-equidistant one dimensional grid) can be determined.

In the next step, a first data package $F_1$ is recorded placing the ultrasound transducer on a first recording location $L_1$ being on the investigation surface and assigning the first data package $F_1$ to a first image column $I_1$ of the ultrasound image corresponding to the first recording location $L_1$. Therefore, loading the first image column $I_1$ is obtained by placing the transducer at the first recording location (the transducer possibly coupled using coupling gel), and then loading the data package $F_1$ thereby obtained into the first image column h. The first recording location is preferably chosen arbitrarily, so that the forthcoming (next) recording locations are determined by $\Delta y$ and the subsequent movement of the transducer. In reality, the investigation surface is not necessarily flat, so that—since the forthcoming recording locations are determined by the direction of transducer movement and the recording spacing $\Delta y$—it may occur that forthcoming recording locations do not fit onto the investigation surface. Evidently, the first recording location (recording point, recording position) is on the investigation surface, since that is where the transducer is stated in the investigation.

Until loading (filling in) the other—at least one—image columns, the following steps are repeated in the method according to the invention.

A subsequent data package is recorded by moving the ultrasound transducer essentially along an image recording line being in an image recording direction, towards a forthcoming recording location. The transducer is moved along the image recording line, which in the course of preferably manual movement only approximates the image recording direction. Smaller deviations from the image recording line do not influence the method. If the transducer were moved completely arbitrarily along the investigation surface, the results would be uninterpretable, since it could not be guaranteed that the image columns derive from data packages being at essentially regularly spaced locations. Based on the steps of method according to the invention, this latter condition is independent from the amplitude or variation of the transducer speed.

In accordance with the above observation, it is required that the image recording line to be essentially in the image recording direction. The direction of image recording is preferably decided by the start of the movement, therefore it is preferably demanded that this line be kept during the further movement. By moving towards a recording location we mean that since the image recording line is approximately followed (to the extent which is allowed by the manual moving), there can be deviation in other directions, the transducer nevertheless approaches the forthcoming recording location.

One or more actual image correlation value is calculated by taking correlation between the subsequent data package and one or more image column corresponding to at least one previous recording location (accordingly, already at the second image column we can take into account the first image column); one or more correlation function value is generated by evaluating a model correlation function either using a distance between the at least one previous recording location and the forthcoming recording location, or a distance between the at least one previous recording location and an estimated location (estimated position) of the subsequent data package. By the estimated location of subsequent data packages the location of the transducer is meant when the subsequent data package is recorded. It is at this stage that one or more actual correlation coefficients are calculated, that is, the correlation is taken of the actual subsequent data packages with data packages corresponding to previous recording locations. The number of correlations that are taken is limited by the number of previous recording locations that are available and by the number of previous recording locations we wish to take into account. In the same number as this, the model correlation function is also evaluated at an x-coordinate corresponding to the number of recording spacings between the forthcoming and the considered recording locations, or at a distance between the at least one previous recording location and the estimated position of the subsequent data package. The calculation of the actual image correlation value and the correlation function values are given below, together with a description of acceptance criteria.

In the course of the method, furthermore, a data package acceptance criterion is evaluated based on comparing the one or more actual image correlation value and the corresponding correlation function value, investigating fulfillment of the acceptance criterion; and if the acceptance criterion is fulfilled, the subsequent data package is assigned, for the forthcoming recording location, to a forthcoming image column $I_2$, $I_3$, $I_k$, $I_{n-1}$, $I_n$ of the ultrasound image loading the forthcoming image column. Thus, the acceptance criterion can be evaluated by comparing the above values (as will be seen below), and using the evaluation it can be determined whether the acceptance criterion is met, in which case the actual data package can be loaded into the forthcoming (next) image column. In the following, the evaluation of the acceptance criterion is described for specific embodiments, and the condition to be met to fulfil the acceptance criterion is also discussed.

The model correlation function may be evaluated for the distances between at least one previous recording location and the forthcoming recording location, or for the distance between the at least one previous recording location and the estimated location of the subsequent data package. The acceptance criterion is based on the comparison between the correlation of the actual (current) subsequent data package and the at least one previous data package (so-called measured correlation) and so-called calculated correlation calculated based on the values of the model correlation function (evaluated at the relevant distances); i.e. on the function shape of the model correlation function. In both cases, using the acceptance criterion, it can be achieved a data package close to the forthcoming recording location is read into the forthcoming image column.

In general, the data packages are recorded at a high sampling frequency and the transducer is moved relatively slowly, so that typically a large number of data packages are evaluated before that data package is recorded which can be read (loaded) into the forthcoming image column according to the acceptance criterion.

It is not a problem for the method according to the invention if transducer movement is temporarily stopped by the user, for instance if the user wishes to examine the previously recorded image columns preferably displayed. In this case, if the device is still switched on, further (subsequent) data packages may be recorded, but the recorded many data packages will not be loaded into the forthcoming image column until the relevant acceptance criterion corresponding to the forthcoming recording location is not met (since if the transducer is standing in one place, then the data packages will not "approach" the image (data package) that would be expected for the forthcoming recording location, i.e. the one or more actual image correlation value and the corresponding correlation function value will not approach to each other to fulfil the acceptance criterion). Therefore, to load data packages into forthcoming image columns, movement of the transducer is needed along the image recording line.

In an embodiment of the method according to invention, the image column is visualized in a display after loading the respective data package into the image column prior to loading a data package into the forthcoming image column. Accordingly, the image columns are displayed immediately after being loaded with the relevant data package. In the method according to the invention, the generated image may also be displayed later, however, if the image is displayed in real-time (interpreted as detailed above), the structure of the medium just investigated by the transducer preferably becomes immediately visible. During display of the image, more than one pixel column is preferably assigned to one image column, since that would mean that the inter-pixel spacing on the computer display would correspond to the recording spacing (nevertheless, it is conceivable to have one pixel column be assigned to one image column). In the preferred embodiment where more than one pixel column is assigned to one image column, the intermediate pixels will also be used to display image column values, in a sense widening each pixel. In case of having intermediate pixel columns, linear interpolation may also be used to calculate the corresponding pixel values.

Therefore, in the method according to the invention, the columns of the ultrasound image are continuously uploaded, as the appropriate data packages are received (acceptance criterion is met). This is in contrast to known methods, where the image columns are loaded afterwards, i.e. after all the data packages are received. In the invention, motion of the transducer and uploading of the image columns occur simultaneously, while in the known methods the image is generated after the investigation is completed, in a separate post-processing step. Accordingly, the known methods do not use pre-defined recording points (locations), but instead use interpolation in the post-processing step to calculate equally spaced image columns.

According to the invention, a much greater number of data packages are recorded than in known methods to be able to select appropriate data packages with sufficient accuracy. In contrast, in the known methods, such a large number of data packages are not recorded since interpolation is applied. The higher number of recorded data packages in the invention does not result in any disadvantage.

By defining the recording spacing $\Delta y$ and the recording locations themselves, and further by recording imaging columns near the recording locations, it can be guaranteed that the imaging columns be loaded with data packages that are uniformly sampled (recorded). In several embodiments, the acceptance criterion is based directly on the one or more difference between the one or more actual image correlation value and the corresponding correlation function value, with the aim that the difference be sufficiently small for the acceptance criterion to be met. In a further embodiment, where the Kalman filter is applied, again the aim is to load the image column with a data package recorded as close as possible to the recording location. In these embodiments, the image columns are typically loaded with data packages on such a region of the image recording line which is before the recording location (nevertheless, the image column is assigned to the given recording location). These deviations between true location and assigned location are typically very small and cannot be sensed when the image is displayed; furthermore, the deviations are generally essentially equal for each desired recording location due also to the definition of the acceptance criterion.

Figure 4:
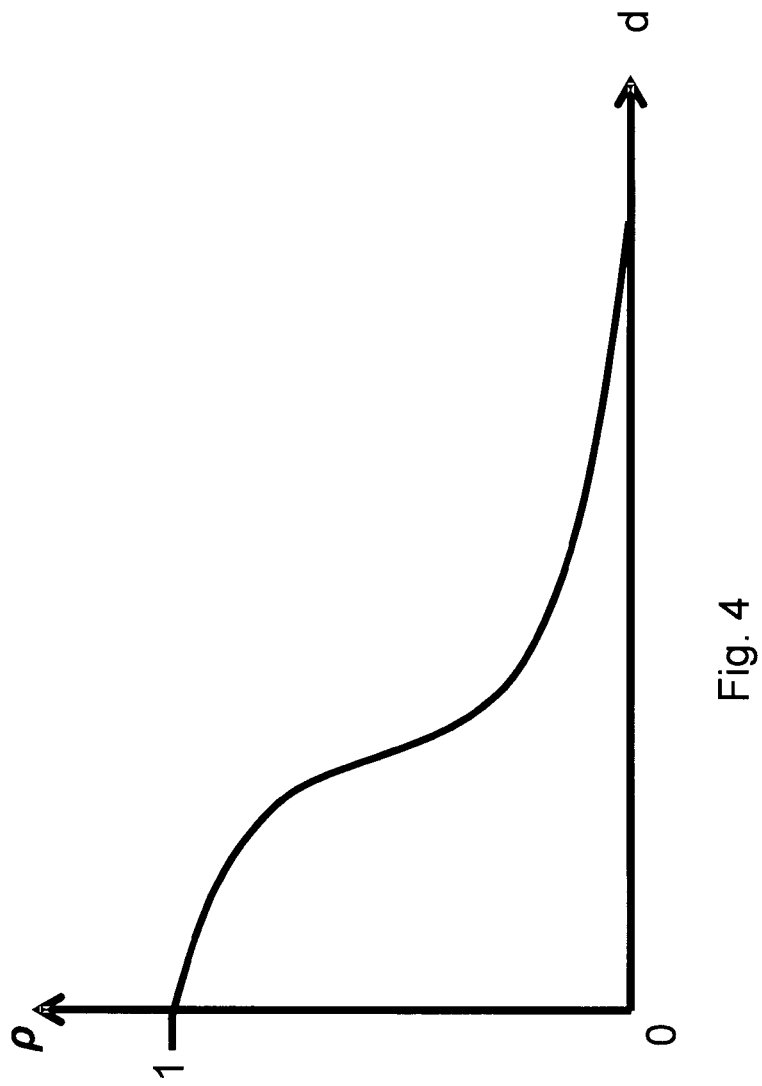
FIG. 4 is a schematic graph showing how the correlation coefficient between two data packages changes as a function of distance.

For a given investigated volume, diverging from a selected location, the correlation between a data package assigned to the selected location and a data package recorded at some second location decreases. A characteristic decay of the correlation is shown in FIG. 4 (accordingly FIG. 4 also shows the characteristic shape of a model correlation function).

The correlation function between two ultrasound lines or images decays with the physical distance between the two locations. The decay of the correlation function is essentially determined by the width of the ultrasound beam applied for recording the data packages, for the reasons described below. The ultrasound image arises from a multitude of point scatterers and the backscattered waves emanating from these scatterers. The point scatterers remains visible on a second ultrasound image for so long as the second ultrasound image is not further away from the first ultrasound image by approximately one beamwidth. This is true for each point scatterer, so that the decay of the correlation can be well characterized by a function illustrated in FIG. 4. The correlation function illustrated in FIG. 4 takes up a value of 0.5 at approximately the beamwidth of the ultrasound beam. If the second image is recorded at a distance from the first image that is greater than the beamwidth, the image will arise predominantly from different scatterers, and the two images start becoming "independent", as their correlation coefficient takes up ever smaller values.

The decay of the correlation described above occurs in a predominant case, namely if the acoustic structure of the investigated medium changes in the elevation direction. If it does not (such as in the case of homogeneous layers), then according to the present invention, an image will only appear if the transducer reaches an inhomogeneity (such as a bubble or a crack). In such a case, where in the elevation direction the investigated medium is homogeneous, the user would only be interested in imaging the medium to look for such inhomogeneities. Otherwise, if the user knows in advance that the image will not change in the elevation direction, then user would not need to perform the imaging in the first place. For this reason it is not a problem if the present invention does not generate images for parts that are homogeneous in the elevation direction. In the case of human tissue, which always has microscopic components, there will always be a change in the elevation direction.

Figure 5:
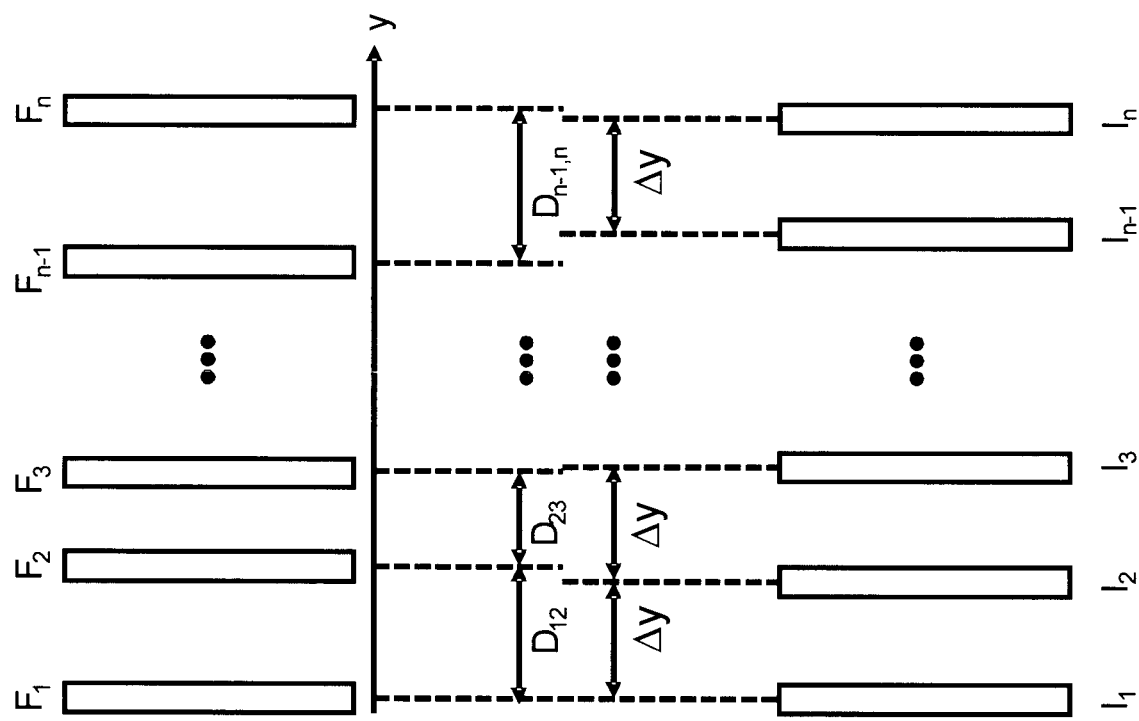
FIG. 5 is a schematic drawing illustrating a prior art scan conversion.

Therefore, in the method according to the invention, an estimate of the correlation function $\rho(d)$ depending on distance d between the data packages is taken. Then, the data packages that are being received at a preferably high rate (>10 Hz) are either, based on an acceptance criterion, accepted in real time (after receipt thereof) into the continuously refreshed and preferably displayed ultrasound image, or otherwise rejected. In the method according to the invention, preferably, a sampling frequency of the data packages is at least 10 Hz. In other words, following the recording of the first data package, it is at this rate that subsequent data packages are preferably recorded. The method according to the invention enables real-time scan conversion to take place, in contrast to the current practice of data-based scan conversion, where all the data packages need to be first received (as illustrated in FIG. 5).

Figure 2:
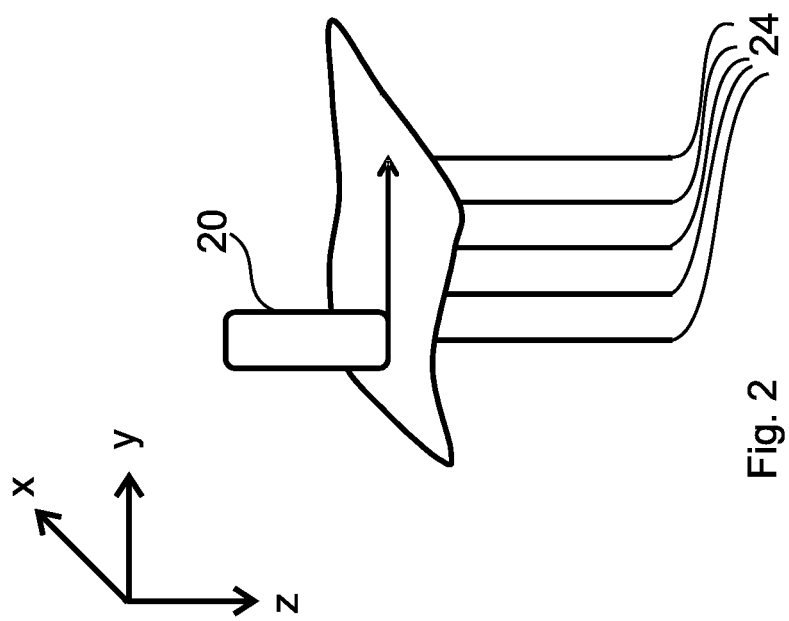
FIG. 2 is a schematic spatial drawing of a series of A-lines that can be obtained by scanning with a single element transducer along the investigation surface.

The method according to the invention is generally applicable to increase the dimension of the image by manual scanning. As shown in FIG. 2, a series of A-lines recorded as data packages generate a 2D image, while in FIG. 3, by recording a series of 2D ultrasound images a 3D image is generated.

In the method according to the invention it is preferred to use a so-called annular array transducer having multiple elements to image human tissue (such as skin) for diagnostic purposes, where the doctor manually scans the transducer, thereby generating a series of A-lines that using the method according to the invention may be used to generate a 2D image in real-time using data-based scan conversion. Annular arrays consist of a series of concentric ring elements (the innermost element being a circle). Their advantage, contrary to other element geometries, is the ability to generate a thin ultrasound beam with a relatively low number of elements, thereby guaranteeing a high image resolution. A further advantage is that the change in beamwidth with depth is small, so the value of the correlation coefficient between two A-lines depends little on the depth of a segment of the A-lines that are being considered. Since annular arrays are only able to focus in one direction, they are ideally suited for mechanical scanning.

In the method according to the invention the model correlation function $\rho(d)$ introduced above is used, which is typically based on estimation and which is dependent on the acoustic structure of the investigated tissue. An estimate of the model correlation function may be provided using known methods, such as by using the assumption of fully developed speckle discussed above. As has been explained above, when fully developed speckle is assumed, $\rho(d)$ can be estimated by the autocorrelation $\rho_P(y)$ in the y-direction of the ultrasound imaging system response $P(x,y,z)$. In such a case the model correlation function $\rho(d)$ is estimated using the expressions provided above, namely $\rho(d)=\rho_F(y=d)$, where $\rho_F(y)=\rho_P(y)$. Several known methods exist for obtaining $P(x,y,z)$, such as by the use of a calibration phantom.

In the case when fully developed speckle cannot be assumed, it can be seen from the equations presented in the introduction that the autocorrelation $\rho_S(y)$ in the y-direction of the response $S(x,y,z)$ of the medium needs to estimated. This is so that the multiplication of $\rho_S(y)$ by $\rho_P(y)$ in the Fourier domain (or alternatively the convolution of the two in the spatial domain) may be used to calculate $\rho_F(y)$, which is used to estimate function $\rho(d)$, i.e the model correlation function. In the following, we make use of the property of $P(x,y,z)$ that in ultrasound imaging, $\rho_F(z)$ is typically an order of magnitude thinner than $\rho_P(y)$, making the former effectively "impulse-like" when comparing it to the latter, particularly when annular array transducer is applied. We further assume that the investigated medium is structurally isotropic (that is, $\rho_S(x)=\rho_S(y)=\rho_S(z)$). Using the aforementioned property and assumption, the following is a relatively accurate estimate $\hat{\rho}_F(y)$ of $\rho_F(y)$:

$$\hat{\rho}_F(y)=\rho_P(y)*\hat{\rho}_S(y), \text{ where}$$

$$\hat{\rho}_S(y)=\rho_F(z).$$

In the equation above $\rho_P(y)$ may be estimated using known methods (as mentioned earlier), and use has also been made of the fact that $\rho_P(z)$ is an order of magnitude thinner compared to $\rho_P(y)$ (impulse-like function), and that $\rho_S$ is isotropic. Substituting the second equation into the first, a relatively accurate estimate $\hat{\rho}_F(y)$ of $\rho_F(y)$ can be obtained. The $\rho_F(z)$ used in the estimate may be calculated from the data packages when they are recorded, but it may also originate from the autocorrelation of a previous data package (for instance, it may be calculated from every Nth data package or from the previous data package) if it is deemed that it does not change appreciably from one data package to the other and a reduction in computing time is desired. According to the lower equation, an accurate estimate of the local autocorrelation of the acoustic scattering function of the investigated medium may be obtained. An even more accurate estimate may be obtained based on deconvolution:

$$\hat{\rho}_S = \mathcal{F}^{-1}\{\mathcal{F}\{\rho_F(z)\}/\mathcal{F}\{\rho_P(z)\}\},$$

which comprises the Fourier transform of the impulse-like $\rho_P(z)$ function. The Fourier transform will be effectively constant when $\rho_P(z)$ is sufficiently impulse-like, however, the above equation is also able to take into account the exact form of $\rho_P(z)$.

Therefore, in accordance with the above, in an embodiment the model correlation function is calculated based on an investigation volume autocorrelation in the direction perpendicular to the image recording direction and the investigation surface of an investigation volume bounded by the investigation surface and on an image generation autocorrelation in the image recording direction of a response of an ultrasound imaging arrangement comprising the transducer. In such a manner a highly accurate estimate of the model correlation function may be obtained. The investigation volume autocorrelation is preferably obtained from the data packages themselves recorded by the transducer, for instance from the first recorded data package, or from an arbitrary location.

In one embodiment, the model correlation function is recalculated deriving the investigation volume autocorrelation from the actually recorded data package. In this embodiment, the model correlation function is always calculated based on the investigation volume autocorrelation obtained based on locally recorded data. In such a manner the local characteristics of the investigation volume can be taken into account to a higher degree, and an even better estimate of the model correlation function is obtained.

It has been mentioned above that, according to the invention, the appropriate one from the received data packages is selected according to an acceptance criterion, i.e. in the case of one-dimensional data packages, the appropriate A-lines into the real-time refreshed and preferably displayed ultrasound image. In the following, this process is described in greater detail using algorithmic steps. When a value x is assigned to a variable y, this is denoted as: y←x.

As a first step, an image grid consisting of recording locations is defined, so that the recording locations determine the locations of the medium for which pixels of the image columns of the image are defined. In the case that the image recording line (path) forms a straight line, the elevational positions (i.e. recording locations) of the image recording line that are traversed by the transducer are at distances 0, $\Delta y$, . . . , $(m-1)\Delta y$ from the first recording location. The ultrasound image that is being formed (generated) is denoted by I, while the image column corresponding to $y=i\Delta y$ will be denoted by $I_{i+1}$. If the incoming data packages are one-dimensional A-lines, the image columns will also be one-dimensional vectors. If the incoming data packages are two-dimensional images, the image columns will also be two-dimensional images. The image recording line, i.e. the image grid can be defined automatically. In this case, the value of $\Delta y$ is pre-determined and the direction of the image recording line, i.e. main direction of image recording is chosen by the user by starting to move the transducer in some direction. In this case the user, by beginning to move the transducer in a direction, proceeds from the first recording location, which line—as it is essentially in the image recording direction—traverses the recording locations or passes very close. It is also possible for the value of $\Delta y$ to be determined by the user, such as by selecting from a series of settings.

Figure 1:
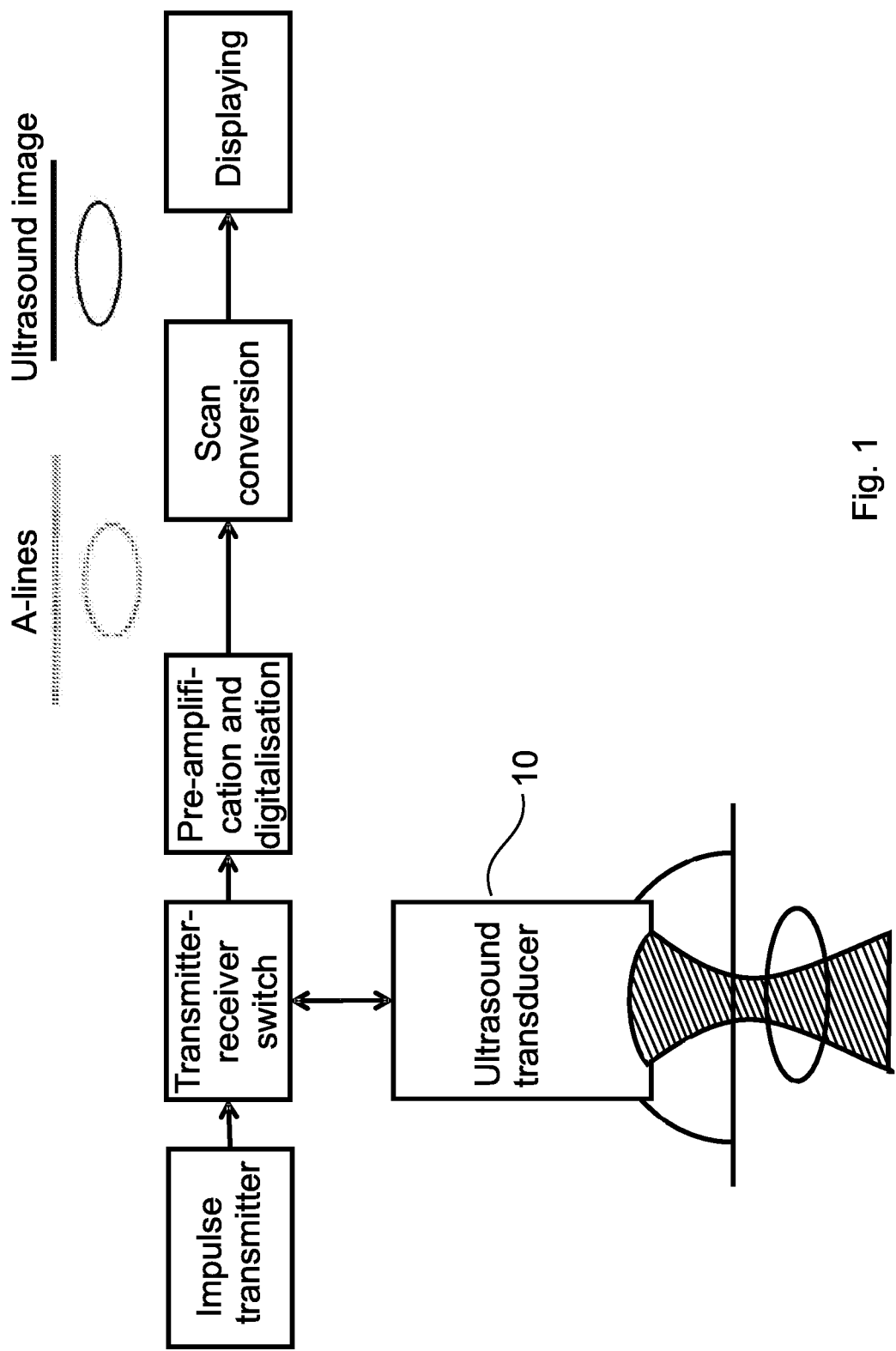
FIG. 1 is a flow diagram illustrating a process of ultrasound imaging.

At the beginning of the method, when the user indicates in some manner (for example, by pressing a button), that he/she would like to begin imaging, the ultrasound electronic circuit shown in FIG. 1 begins to operate. As the imaging procedure begins, the user starts moving the transducer along the image recording line, mostly in the y-direction of the figures (see FIGS. 2 and 3).

The first image column takes the values of the first recorded data package: $I_1 \leftarrow F_1$ (the first data package is assigned to the first image column). It can be seen from this initialization that the elevation (y, i.e. along the image recording line) positions of the image grid are relative, as they are defined with reference to the first data package, where the elevational position of the first data package is 0. Let i be the index of the most recent data package, and k the index of the image column waiting to be loaded. If $F_i$ meets the acceptance criterion $BEF\{F_i,k\}$, then $I_k \leftarrow F_i$, that is, the data package $F_i$ is loaded to the k-th column of the ultrasound image, and k is incremented by one.

If the user indicates that he/she would like to freeze the ultrasound image, then the method according to the invention for generating ultrasound image will stop. Otherwise, further data packages are collected, the acceptance criterion is checked for these data packages, and those data packages where the acceptance criterion is met are loaded into the relevant image columns of the ultrasound image.

The acceptance criterion $BEF\{F_i, k\}$ is met when the correlation $\rho_{I_{k-j},F_i}$ of the candidate data package $F_i$ for $I_k$ with previously accepted data packages $I_{k-j}$ (where k–j is the index of the recording location) shows values that are expected from $I_k$. The acceptance criterion may be defined using the following equation:

$$BEF\{F_i,k\}=\Sigma_{j=1\ldots J}w(j,J)|\rho_{I_{k-j},F_i}-\rho(j\Delta y)|<\varepsilon, \text{ where}$$

$$\rho_{I_{k-j},F_i}=I_{k-j}\cdot F_i$$

The lower equation defines the correlation between the (k–j)-th image column (corresponding to the (k–j)-th recording location) and the i-th data package. If J>1, then this correlation is calculated for several values of index j (in the upper expression), so that several previously accepted data packages are correlated with the actual (current) $F_i$ subsequent data package, returning several actual correlation values $\rho_{I_{k-j}, F_i}$. It can be seen from the equation that what is examined is the deviation of these correlation values $\rho_{I_{k-j}, F_i}$ from $\rho(j\Delta y)$ (see expression inside absolute operator), i.e. according to the variable index j, a plurality of correlation function values is calculated evaluating the model correlation function ($\rho(d)$) with a multiplication of the recording spacing (i.e. the recording spacing is multiplied when substituted into the function by the number of recording locations between the relevant previous recording location and the forthcoming recording location plus one). This means that in the comparison with the closest (indicated by k in the expression) recording location, there is zero number of recording locations between the current recording location and the closest recording location; accordingly, since a number greater by one should be considered, $\Delta y$ is multiplied by one when the model function is evaluated. Then, supposing a data package corresponding to one previous recording location is available, the correlation of this previous data package with the actual subsequent data package has to be compared with the model correlation function evaluated at $2\Delta y$ according to the above rules, and so on. It can be seen from the upper equation that a weighted sum is taken of these differences, and this sum is compared in the acceptance criterion with an error tolerance ε, which gives the difference threshold value. In the equation, the examined difference is an absolute difference, but one may also express the difference in other forms, such as by the non-absolute difference or the squared difference.

Accordingly, in the above equations, J refers to a window size that determines how many previous accepted data packages (or image columns) are compared to the data package $F_i$–t, where J<i, and w(j,J) is some weighting function. If k<J, in other words there is not available J previous image columns, then the maximum value taken by j will be k–1, so that all previous image columns, even up to the first image column ($I_1$) will be considered in the equation. In this case evidently it is not possible to use a window of size J, as the necessary number of image columns will not be at our disposal.

Furthermore, in the lower equation of the above two equations, the operator refers to a dot or scalar product, causing all corresponding values of $I_{k-j}$ and $F_i$ (in the case of 1D data packages, all vector components, while in the case of 2D data packages, all matrix elements) to be multiplied with each other before the resulting values are all summed together. If the autocorrelation, i.e. the model correlation function is normalized, then the values of $\rho_{I_{k-j}, F_i}$ are accordingly to be normalized. The normalization coefficient estimates the energy of the data packages, so that for example the coefficient may have the following values: $\sigma_{I_{k-j}} \sigma_{F_i}$, $\sigma_{I_{k-j}}^2$, $\sigma_{F_i}^2$, where $\sigma_u$ is the standard deviation of the variable u.

The parameters used in the upper equation of the above two equations will depend on the application, but one possible set of parameters is ε=0.05; J=1; w(1,1)=1 (so that the actual data package is only compared with the previously accepted data package, with a weighting of one in the acceptance criterion) and a function $\rho(d)$ and $\Delta y$ such that $\rho(\Delta y)=0.5$.

From the above example it can be noticed that it is preferred to set $\Delta y$ such that it is similar to the ultrasound beamwidth. Among other reasons, this is advantageous because the data packages described above (be they 1D A-lines or 2D ultrasound images) will be considered sufficiently independent from each other, thus it is preferred to display in an ultrasound image obtained from data packages approximately those data packages which have such a distance among each other. The beamwidth typically ranges between 0.1 and 5 mm, while $\Delta y$ may be typically in the range of between 0.02 and 1 mm. Using such parameters and a typical data package sampling frequency (at least 10 Hz), the transducer needs to be moved at a sufficiently low speed so that between two recording locations, a sufficient number of data packages be generated to record a data package which is sufficiently close to the forthcoming recording location to fulfil the acceptance criterion. The motion speed is typically about between 1 and 100 mm/s; at a high enough data package acquisition rate (sampling frequency) the transducer may be manually scanned at comfortable pace on the investigation surface to achieve the desired result.

In order to provide an illustration of the data package sampling frequency that may be necessary in a given application, let us consider an ultrasound transducer that can be used to examine human skin, with a beamwidth of 0.2 mm. Since beamwidth indicates also the resolution, a decision may be made to make the image grid in the lateral direction be 5 times denser than the beamwidth, so that $\Delta y$=0.04 mm. In order to allow to select such data packages from the incoming data packages with appropriate accuracy, which fits to the grid points, we would like to read at least ten data packages between every accepted data packages. This means that there is a movement of 0.004 mm between generating two data packages. If the user moves the transducer at a maximum speed of 10 mm/s, this requires a data package sampling frequency of 2.5 kHz. In the case of A-lines, this is an achievable rate, since the main limiting factor of the data package sampling speed is that the next sound impulse (see FIG. 1) should be transmitted only when all signals get back from the previous sound impulse. In the case of skin ultrasound, frequencies are used (15-50 MHz) where due to attenuation the maximum depth from which echoes return is approximately 30 mm. With a typical speed of sound propagation of 1500 m/s, this creates a maximum propagation time of 40 microseconds from the deepest place from where the echo can come back. This means that a maximum data package sampling speed of 25 kHz may be used. This means that the 2.5 kHz required in the above example is feasible.

It should be noted that the model correlation function $\rho(d)$ may be calculated prior to the beginning of the imaging operation, or simultaneously with the beginning of imaging, and may even be continuously refreshed during operation, for instance if the estimate of $\rho(d)$ is based on $\rho_F(z)$ obtainable from the data packages, as has been described above.

In the present embodiment, therefore, the one or more correlation function value is generated by evaluation of the model correlation function for a distance of the at least one previous recording location and the forthcoming recording location; the data package acceptance criterion is evaluated based on the difference between the one or more actual image correlation value and the corresponding correlation function value; based on the one or more difference, the acceptance criterion method is met if the sum of the one or more difference is smaller than a predefined difference threshold value. As in the above, to meet the acceptance criterion a weighted sum of a plurality of differences is compared to the pre-defined difference threshold value. The difference between the one or more actual image correlation value and the corresponding correlation function value gives the correlation difference, based on which the acceptance criterion can be evaluated.

The acceptance criterion $BEF\{F_i,k\}$ may be extended or generalized in several ways. The value of the error threshold ε may change instead of being a constant, for instance based on the incoming data packages. The value of ε may also change if a future data package shows a lower correlation difference than the actually investigated data package, in which case the imaging column may be updated completely with the actual data package, or else be updated in a weighted manner (such as by using a forgetting function), modifying thereby also the calculation of forthcoming data columns. In this manner, the updated image column may be used to provide updated estimates of the correlation difference for forthcoming imaging columns. For applying such an acceptance criterion it is necessary that the correlation difference be calculated even after data packages have been received that could be accepted into the image column based on the error tolerance. In addition, the acceptance criterion may also be defined in such a manner that the correlation difference (or a weighted average thereof) is studied until an increase is noticed in the difference and the data package that shows the lowest difference value is selected to the forthcoming image column for the forthcoming recording location.

It is also conceivable that a data package is chosen when the next n data packages show a greater correlation difference. In accepting the data package, recording of subsequent data packages must be waited. The acceptance criterion may express the difference in other ways, for instance by using sum of squared differences.

The invention allows the generation of different ρ(d)–s, since by variation of the shape, amplitude or delay of the pulses transmitted by the transducer element or elements, as well as by applying summation of the received electrical signals with different weights and delays, the variation of function P in the elevation direction can be modified; accordingly ρ(d) is modified. The modification of the beamwidth is possible in many transducers, although in some transducers (e.g. linear array transducer) this is only possible by changing the shape of the transmitted pulse (in essence, the central frequency of the pulse). Generation of different ρ(d)–s is advantageous because the values of the inverse function d(ρ) are uncertain when ρ(d) is near 0 or 1 (see FIG. 4). Although the extent to which the elevation beamwidth can be increased or decreased is fixed, in many cases changing of ρ(d) allows the distance (i.e. the model correlation function in the correlation difference) between the two data packages to be estimated based on ρ(d) in such a way that a more accurate distance estimate is provided. As a consequence, the above definition of the acceptance criterion may be extended in such a way that several beamwidths (and thus several model correlation functions ρ(d) (indexed by l) are employed, and are combined with the appropriate weights:

$$BEF\{G_i, k\} = \left\{ \sum_{l=1...L} \sum_{j=1...J} w^l(j, J) |\rho_{l_{k-j}, F_i} - \rho^l(j\Delta y)| \right\} < \varepsilon,$$

$$G_i = \sum_{l=1...L} \omega_l F_i^l,$$

where $\rho^l$ is the estimated autocorrelation function corresponding to the l-th type of beam (L types of autocorrelation functions are used according to the upper limit of index l), $G_i$ is the weighted average of the data packages, using weights $\omega_l$ for the data package $F_i^l$ corresponding to the l-th beam; and $w^l(j,J)$ is a weighting function for the l-th beam. It should be noted that the time elapsed between the recording of data packages $F_i^l$ with different beams should preferably be so short (e.g. <50 ms) so as to make the distance traveled during that time to be negligible. Thus, upon meeting the acceptance criterion, an averaged $G_i$ may preferably be loaded into the image column instead of a single data package $F_i^l$. In the present embodiment, therefore, the beamwidth of the transducer is preferably altered in the elevation direction electronically.

In the present embodiment the model correlation function is evaluated for a plurality of different beamwidths, thereby generating one or more beamwidth-dependent correlation function value for each of the different beamwidths, and the data package acceptance criterion is evaluated based on the comparisons, corresponding to each of the different beamwidths, of the one or more actual image correlation value and the corresponding beamwidth-dependent correlation function value. The concept of evaluating the acceptance criterion for several beamwidths can also be applied to other definitions of the acceptance criterion.

In one embodiment of the method an acceptance criterion differing from the above definitions is employed. In this embodiment, an estimate $\hat{y}_i$ is given for the elevational (y, along the image recording line) position of the transducer. In the present embodiment, according to an acceptance criterion, the actual subsequent data package is accepted when its location and desired recording position is sufficiently close. Accordingly, in the present embodiment the acceptance criterion is:

$$BEF\{F_i,k\} = |\hat{y}_i - k\Delta y| < \bigstar,$$

where ∈ (lunate epsilon) is a position threshold that is an error tolerance similarly to the above defined ε (small letter epsilon). The estimate of $\hat{y}_i$ may be obtained from a position estimator algorithm (preferably implemented in (integrated to) the Kalman filter described below). This position estimator takes into account the acceptance time of previously accepted data packages, and from this it can derive the previous speed history of the transducer. According to the invention, a Kalman filter is employed to estimate position so as to be able to incorporate into the acceptance criterion both the correlation of the actual data package $F_i$ with previously accepted data packages, as well as the previous speed (and optionally higher temporal derivatives of position) of the transducer. As it is known, the Kalman filter requires the following to be defined:

1. An internal state space. In the current case, this comprises the unknown position $y_i$ and N≥1 temporal derivatives thereof (so that at least the velocity is always considered).
2. A system of linear differential equations that describes the expected evolution of the internal state space. In the current case this is a 1D dynamic system, where the (N+1)-th derivative of $y_i$ is 0. If, for instance, we consider up to the second derivative (so that third temporal derivative of the position is 0), then the system of equations will be the following (there appears in the equation an error vector $w_k$; this error vector has a normal distribution with 0 mean and covariance Q):

$$\begin{bmatrix} y_i \\ \dot{y}_i \\ \ddot{y}_i \end{bmatrix} = \begin{bmatrix} 1 & \Delta t & \Delta t^2/2 \\ 0 & 1 & \Delta t \\ 0 & 0 & 1 \end{bmatrix} \begin{bmatrix} y_{i-1} \\ \dot{y}_{i-1} \\ \ddot{y}_{i-1} \end{bmatrix} + w_k, \text{ where } w_k \sim N(0, Q)$$

3. A space of observable variables. In the current case this is the correlation $\rho_{I_{k-j},F_i}$ of the actual data package $F_i$ with the previously accepted data packages $I_{k-j}$.

4. A system of equations that describes the relationship between the observable variables (in the current case $\rho_{I_{k-j},F_i}$) and the internal state space (in the current case $y_i$ and its N≥1 derivatives). In the current case this is the model correlation function ρ(d), which is dependent solely on a single variable of the internal state space, namely $y_i$. This system of equations is therefore the following (noting the appearance of an error vector $v_k$ that has a normal distribution with 0 mean and R covariance):

$$\begin{bmatrix} \rho_{I_{k-1},F_i} \\ \vdots \\ \rho_{I_{k-J},F_i} \end{bmatrix} = \rho\left(\begin{bmatrix} y_i - (k-1)\Delta y \\ \vdots \\ y_i - (k-J)\Delta y \end{bmatrix}\right) + v_k, \text{ where } v_k \sim N(0, R).$$

By the help of the above equation an estimation can be obtained for y with which the position estimation calculated based on dynamic variables can be made more accurate. To both system of equations covariance matrices correspond that may be calculated based on the error vectors. The standard deviation is set empirically, according to known methods.

For applying in the invention, the Kalman filter operates by the following steps:

1. Based on the above physical model, the variables of the internal state space (y and N derivatives thereof) are estimated for the next time step (that is, for the newly recorded subsequent data package). Based on the physical model, the covariance of the error of the internal state space is also estimated for the next time step.

2. The so-called residual (see Kalman filter, second equation) is calculated that expresses the difference between the observed variables and expected variables corresponding to the estimated position (it can be seen according to the second equation of the Kalman filter that in contrast to previous embodiments, here the model correlation function is not evaluated at multiples of the recording spacing but at distances between the estimated position and the previous recording locations). The covariance is also calculated for this correlation difference.

3. Based on the covariance of the correlation difference, an accurate estimate of the internal state space is obtained (i.e. of y and its higher derivatives), updating the internal state space covariance.

In order to carry out the above steps, a Kalman filter can be adapted in a known manner (https://en.wikipedia.orgi-wiki/Kalman_filter#Details).

The Kalman filter, whose application has been described above, is able to use a physical model as well as the covariance of observations through the above steps, and, at the same time, it is able to modify the internal state space based on how much the measurement expected from the internal state space differs from the actual measurement.

Therefore, in the embodiment described above, the estimated location of the subsequent data package is determined, generating dynamic error estimation (the error estimations are called above as error vector) based on dynamic equations, by a Kalman filter; evaluating the model correlation function for the distance between the at least one previous recording location and the estimated location of the subsequent data package, the one or more correlation function value is generated by the Kalman filter; based on the comparison of the one or more actual image correlation value and the corresponding correlation function value, a correlation error estimation is generated by the Kalman filter for the estimated location; and, based on the estimated location, the dynamic error estimation and the correlation error estimation, a correlation-based estimated location is determined by the Kalman filter, and the acceptance criterion is met if the difference between the correlation-based estimated location and the forthcoming recording location is smaller than a predefined position threshold value.

It is emphasized that known methods of ultrasound imaging typically generate 3D images from a set of 2D images (one-time recording of 2D data packages), while in the method according to the invention may also be used when 1D data packages (A-lines) are recorded in order to create a 2D image. Since loading of the image columns occurs real-time, immediately after the data packages have been recorded, the image columns can be displayed in real time (in the above meaning of real-time). In such a way, the doctor is able to see using a single element transducer in real time the A-line that the transducer has just "uncovered" (in other words, the data package that has just been accepted into a forthcoming image column).

According to the above, it is preferable that during manual scanning the transducer traverse as accurately as possible the recording points along the image recording line. However, it is conceivable that the maximum elevation position y=(m−1)Δy is exceeded by the elevation position of the transducer. In such a case it is possible that the number of grid positions of pre-defined image recording line increases, so as to provide space for the display of additional image columns.

During scanning it is also conceivable for the user to change direction, taking a negative elevational position for the transducer. This may be detected by the correlation of the data package with the first image column $I_1$ being higher than the correlation with other recorded A-lines, with the correlation coefficient being appreciably lower (beyond an error limit) than 1 (so the new A-line is distinguishable from $I_1$). Then, similarly to the previous case, the image recording line may be extended in the negative direction (to comprise recording locations also in this direction), and arrangements may be made to fit the extra image columns on the display (such as by shifting the displayed image part to show the newly recorded parts).

Figure 3:
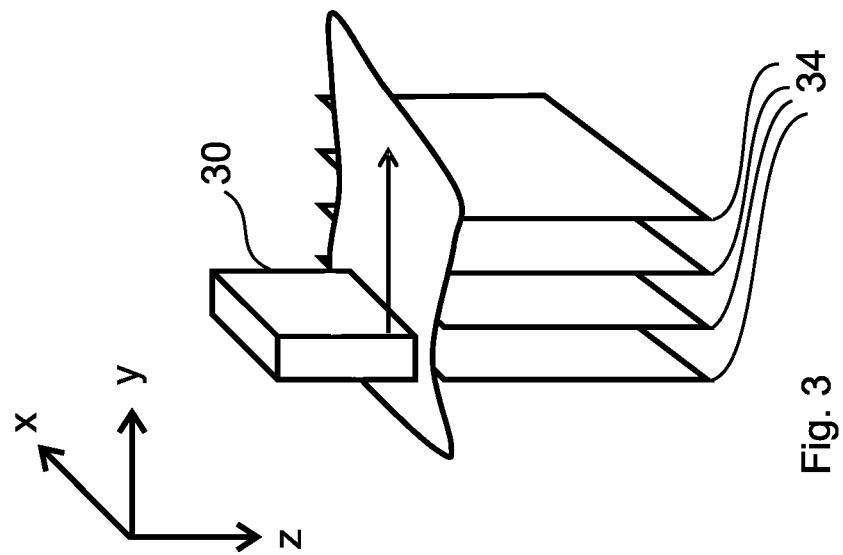
FIG. 3 is a schematic spatial drawing of a series of 2-D images that can be obtained by scanning with a linear array transducer along the investigation surface.

The transducer is preferably moved translationally exclusively in the image recording direction, i.e. in FIGS. 2 and 3 the y-direction. Although it is advantageous for the user to attempt to move the transducer as much as possible in this manner, the invention may be generalized to cases where such a condition is not met.

Figure 7C:
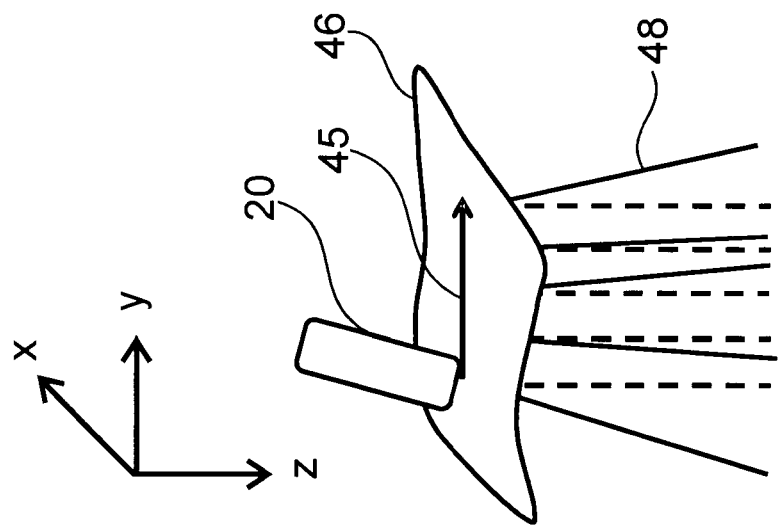
FIGS. 7A-7C are schematic spatial drawings illustrating movement deviations of a transducer.
Figure 7B:
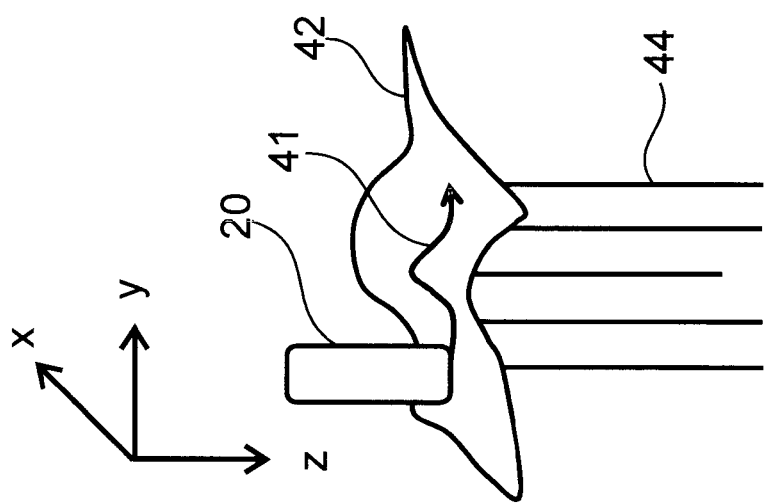
Figure 7A:
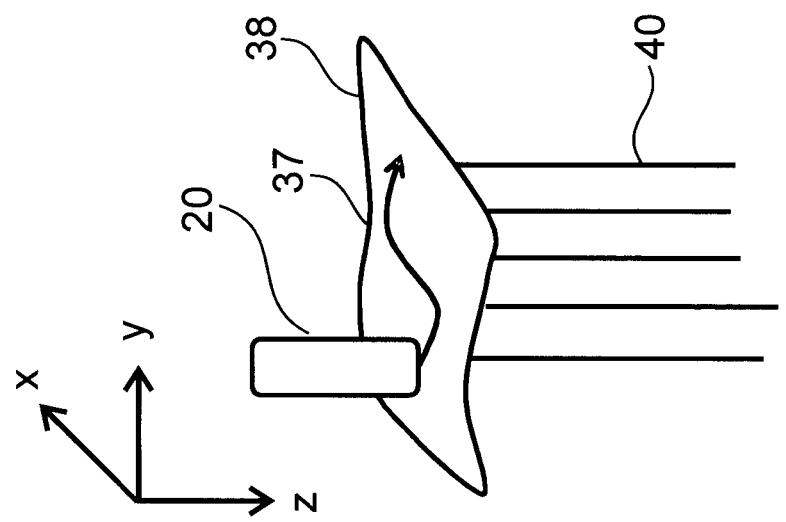

Overall, the movement of the transducer can deviate from the ideal y-direction movement in three ways, which deviations are illustrated in FIGS. 7A-7C. In the following, these movement deviations, as well as currently known methods to correct them, are described (noting that in the current practice, sets of 2D images are used to create 3D images). In the following, the modifications to be applicable to the inventions are also provided; and the generalization is shown to a preferred realization, where sets of 1D A-lines are used to generate 2D images.

In the first case illustrated by FIG. 7A, the transducer 20 deviates from the y-direction by moving in the x-y plane along an investigated surface 38, passing through an image recording line 37 during which it records data packages 40. In current practice the data packages are 2D images, so that it is possible to use cross-correlation techniques borrowed from panoramic imaging to register the images in the x-direction, thereby correcting for lateral movement, before the correlation is calculated between them.

In the embodiment of the invention where 2D data packages are recorded, in the interests of real-time display (where real-time means that a data package is displayed as soon as it is accepted), each incoming data package is first compared with the last accepted data package using cross-correlation, and, if needed, it is corrected based on this comparison, before its eligibility to be accepted is evaluated using the acceptance criterion. As can be seen from the above, such lateral (x) alignment is not possible in the case of 1D A-lines. Therefore, in the case of A-lines the invention does not seek to correct movement in the x-direction, but rather follows the principle that if the user, in addition to subjecting the transducer to y-directional (elevational direction) movement, also moves the transducer in the x-direction (transversal direction), this is of his/her choosing in order to uncover the desired region of a body.

The movement of the transducer may also contain a component in the z-direction (also known as the axial direction, in other words the direction of the transducer axis, which is perpendicular to the elevational and transverse directions, as shown in FIGS. 2 and 3); such a case is illustrated in FIG. 7B. In this example, transducer 20 is moved on an investigation surface 42 along an image recording line 41. The investigation surface 42 is not flat, but rather varies in the z-direction. While the transducer 20 is moved along the line of movement 41, data packages 44 are being recorded. The above procedure can be extended to the case where movement in the z-direction occurs. In the case of 2D data packages, the correlation between two data packages can be used to detect movement in the z-direction between recording the two data packages. This correction is also possible in the case of A-lines: by calculating the cross-correlation between the last accepted data package and the just received data package, the movement in the z-direction can be corrected before subjecting the candidate A-line to the acceptance criterion. In the case when the data packages comprise strong surface boundaries that may compromise the accuracy of the estimate of the movement in the z-direction, it is possible to (manually or automatically) choose a region of the image where speckle dominates and to use this region for the movement estimate. Due to the high frequencies that may be involved, the strong surface boundaries do not necessarily compromise the correction in the z-direction. When automatic region selection is employed, a metric based on the region intensity may be used as a decision metric (see for example U.S. Pat. No. 6,988,991).

During scanning, the angle of the transducer may also change; such an example is shown in FIG. 7C, where during the recording of data packages, the angle of the transducer 20 changes as it moves across an investigation surface 46 along an image recording line 45. Data packages 48 are acquired using the transducer 20 whose angle is changing. In current practice, known approaches usually involve 2D data packages, where the image can be segmented into blocks, and the movement between corresponding blocks is used to estimate tilt angles (see for example U.S. Pat. No. 6,988, 991). This approach is based on the fact that when a line is rotated around an axis that intersects the line, the movement of a point on the line is directly proportional to the distance from the point of intersection. This means that by estimating the movement at several points along the line, the angular rotation may be estimated. Therefore, according to an embodiment of the invention, the acquired data packages can be segmented into blocks, and these can be correlated with the corresponding blocks of the last accepted data packages, similarly to known approaches. In the case of A-lines, the data packages are segmented into 1D blocks instead of 2D blocks.

In some embodiments of the method according to the invention illustrated above 1D data packages (A-lines) are acquired, preferably using an annular transducer. In other embodiments, 2D data packages (2D ultrasound images) are acquired, on which the method according to the invention may also be applied. In the method according to the invention, single element transducers, linear arrays (comprising a multiplicity of elements along a line), or other transducer types may all be used.

The movement of the transducer along the image recording line is preferably manual. The image recording line and the direction of the manual movement (elevational movement, y-direction) are partially or wholly perpendicular to the line or plane that is electronically scanned by the ultrasound transducer.

Some embodiments of the invention relate to a computer readable medium comprising a computer readable program, which computer readable program, when executed on a computer, causes the execution of an embodiment of the method according to the invention.

The invention is, of course, not limited to the preferred embodiments described in details above, but further variants, modifications and developments are possible within the scope of protection determined by the claims.

The invention claimed is:

1. A method for generating an ultrasound image based on data packages, in which the data packages are recorded by moving an ultrasound transducer along an investigation surface, the method comprising:
   determining a plurality of recording locations separated from each other by a recording spacing;
   recording a first data package by placing the ultrasound transducer at a first recording location on the investigation surface and assigning the first data package to a first image column of the ultrasound image corresponding to the first recording location; and
   repeating a plurality of steps until at least one forthcoming image column is loaded with a subsequent data package, the plurality of steps including:
      recording the subsequent data package by moving the ultrasound transducer in an image recording direction towards a forthcoming recording location,
      calculating one or more actual image correlation values by taking a correlation between the subsequent data package and one or more image columns corresponding to at least one previous recording location,
      generating one or more correlation function values using a Kalman filter by evaluating a model correlation function using distance between the at least one previous recording location and an estimated location of the ultrasound transducer when the subsequent data package was recorded, wherein the estimated location of the subsequent data package is determined by generating a dynamic error estimation based on dynamic equations using the Kalman filter,
      evaluating a data package acceptance criterion based on a comparison of the one or more actual image correlation values and corresponding correlation function values, wherein, based on the comparison of the one or more actual image correlation values and the corresponding correlation function values, a correlation error estimation is generated by the Kalman filter for the estimated location, and, based on the estimated location, the dynamic error estimation and the correlation error estimation, a correlation-based estimated location is determined by the Kalman filter, wherein the data package acceptance criterion is fulfilled if a difference between the correlation-based estimated location and the forthcoming recording location is smaller than a predefined position threshold value, and if the data package acceptance criterion is fulfilled, assigning, for the forthcoming recording location, the subsequent data package to a forthcoming image column of the at least one forthcoming image column of the ultrasound image by loading the subsequent data package into the forthcoming image column.

2. The method according to claim 1, wherein the ultrasound transducer is part of an ultrasound imaging system, and the method further comprising:

calculating the model correlation function based on: an investigation volume autocorrelation in a direction perpendicular to both the image recording direction and the investigation surface of an investigation volume bounded by the investigation surface and an image generation autocorrelation of the ultrasound imaging system, the autocorrelation being in the image recording direction.

3. The method according to claim 2, further comprising:
deriving the investigation volume autocorrelation from one of the data packages recorded by the ultrasound transducer.

4. The method according to claim 3, further comprising:
recalculating the model correlation function that derives the investigation volume autocorrelation from the actually recorded data package.

5. The method according to claim 1 wherein a sampling frequency of the data packages is at least 10 Hz and not more than 25 kHz.

6. The method according to claim 1 wherein a respective image column is visualized in a display after loading a respective data package into the image column prior to loading the subsequent data package into the forthcoming image column.

7. The method according to claim 1 wherein one-dimensional data packages are recorded.

8. The method according to claim 1 wherein the ultrasound transducer is an annular array transducer or a single element transducer.

9. The method according to claim 1 wherein two-dimensional data packages are recorded.

10. The method according to claim 1 wherein the ultrasound transducer is moved manually in the image recording direction.

11. The method according to claim 1 wherein the model correlation function is evaluated for a plurality of different beamwidths, thereby generating one or more beamwidth-dependent correlation function values for each of the plurality of different beamwidths, and the data package acceptance criterion is evaluated for the one or more actual image correlation values and a corresponding beamwidth-dependent correlation function value for each of the plurality of different beamwidths.

12. A computer program product for generating an ultrasound image based on data packages, in which the data packages are recorded by moving an ultrasound transducer along an investigation surface, the computer program product comprising:

a non-transitory computer readable storage medium; and
a computer readable program stored on the non-transitory computer readable storage medium that, when executed on a computer, causes the computer to:
determine a plurality of recording locations separated from each other by a recording spacing;
record a first data package with the ultrasound transducer placed at a first recording location on the investigation surface and assign the first data package to a first image column of the ultrasound image corresponding to the first recording location; and
repeat a plurality of steps until at least one forthcoming image column is loaded with a subsequent data package, the plurality of steps including:
record the subsequent data package while the ultrasound transducer is moved in an image recording direction towards a forthcoming recording location,
calculate one or more actual image correlation values by taking a correlation between the subsequent data package and one or more image columns corresponding to at least one previous recording location,
generate one or more correlation function values using a Kalman filter by evaluating a model correlation function using a distance between the at least one previous recording location and an estimated location of the ultrasound transducer when the subsequent data package was recorded, wherein the estimated location of the subsequent data package is determined by generating a dynamic error estimation based on dynamic equations using the Kalman filter,
evaluate a data package acceptance criterion based on a comparison of the one or more actual image correlation values and corresponding correlation function values, wherein, based on the comparison of the one or more actual image correlation values and the corresponding correlation function values, a correlation error estimation is generated by the Kalman filter for the estimated location, and, based on the estimated location, the dynamic error estimation and the correlation error estimation, a correlation-based estimated location is determined by the Kalman filter, wherein the data package acceptance criterion is fulfilled if a difference between the correlation-based estimated location and the forthcoming recording location is smaller than a predefined position threshold value, and
if the data package acceptance criterion is fulfilled, assign, for the forthcoming recording location, the subsequent data package to a forthcoming image column of the at least one forthcoming image column of the ultrasound image by loading the subsequent data package into the forthcoming image column.

* * * * *